(12) United States Patent
Kannan et al.

(10) Patent No.: US 8,434,571 B2
(45) Date of Patent: May 7, 2013

(54) SECUREMENT OF LINES TO DOWNHOLE WELL TOOLS

(75) Inventors: Bharathwaj Kannan, Spring, TX (US); Brett W. Bouldin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 221 days.

(21) Appl. No.: 12/481,747

(22) Filed: Jun. 10, 2009

(65) Prior Publication Data

US 2009/0314498 A1 Dec. 24, 2009

(30) Foreign Application Priority Data

Jun. 23, 2008 (WO) ................ PCT/US2008/067878

(51) Int. Cl.
*E21B 17/10* (2006.01)
(52) U.S. Cl.
USPC ............ 175/325.4; 166/378; 166/241.6
(58) Field of Classification Search .......... 166/242.1, 166/65.1, 380, 378, 385, 242.2, 241.6, 241.7, 166/183; 175/320, 325.1, 325.2, 325.3, 325.4, 175/325.5, 325.6, 325.7, 171
See application file for complete search history.

(56) References Cited

U.S. PATENT DOCUMENTS

| | | | |
|---|---|---|---|
| 4,465,139 A * | 8/1984 | Marquez et al. ............... 166/373 |
| 5,803,170 A * | 9/1998 | Garcia-Soule et al. ..... 166/242.3 |
| 6,681,854 B2 | 1/2004 | Danos | |
| 6,877,553 B2 * | 4/2005 | Cameron ........................ 166/207 |
| 7,131,494 B2 | 11/2006 | Bixenman et al. | |
| 7,213,657 B2 | 5/2007 | Vold et al. | |
| 7,777,644 B2 * | 8/2010 | Madhavan et al. ......... 340/854.4 |
| 7,866,405 B2 * | 1/2011 | Richards et al. ............... 166/380 |
| 2003/0168221 A1 * | 9/2003 | Zachman ....................... 166/378 |
| 2004/0206511 A1 * | 10/2004 | Tilton et al. ................... 166/380 |
| 2007/0039727 A1 | 2/2007 | Holt et al. | |
| 2007/0102197 A1 * | 5/2007 | Rotthaeuser .................. 175/320 |

OTHER PUBLICATIONS

International Search Report and Written Opinion issued Feb. 26, 2009, for International Patent Application Serial No. PCT/US08/67878, 9 pages.

International Preliminary Report on Patentability with Written Opinion issued Jan. 13, 2011, for International Patent Application No. PCT/US08/067878, 7 pages.

* cited by examiner

*Primary Examiner* — Giovanna C. Wright
*Assistant Examiner* — Ronald Runyan
(74) *Attorney, Agent, or Firm* — Smith IP Services, P.C.

(57) ABSTRACT

Apparatus and methods for securement of lines to downhole well tools. A method of securing one or more lines to a well tool includes the steps of: installing the one or more lines in a groove formed longitudinally along an outer surface of the well tool, the groove having a width at the outer surface of the well tool which is narrower than a width of the groove at a position radially inward relative to the outer surface; and securing the one or more lines in the groove. A well tool includes a groove formed longitudinally along an outer surface of an outer housing of the well tool. The groove has a width at the outer surface of the well tool which is narrower than a width of the groove at a position radially inward relative to the outer surface. One or more lines are secured in the groove.

17 Claims, 4 Drawing Sheets

SECUREMENT OF LINES TO DOWNHOLE WELL TOOLS

CROSS-REFERENCE TO RELATED APPLICATION

The present application claims the benefit under 35 USC §119 of the filing date of International Application No. PCT/US08/67878, filed Jun. 23, 2008. The entire disclosure of this prior application is incorporated herein by this reference.

BACKGROUND

The present disclosure relates generally to equipment utilized and operations performed in conjunction with subterranean wells and, in an embodiment described herein, more particularly provides apparatus and methods for securement of lines to downhole well tools.

It is frequently desirable to attach one or more umbilicals or lines to an exterior of a tubular string in a subterranean well. Such lines may include hydraulic, electrical, fiber optic, communication, sensor, power, control and/or other types of lines.

To conserve radial clearance, it is sometimes useful to extend the lines longitudinally along a groove formed into an external surface of a well tool (such as a valve or other type of flow control device, etc.) interconnected in the tubular string. Unfortunately, conventional means of securing the lines in the groove consume a significant portion of a wall thickness of the well tool.

A pressure rating, strength or utility of the well tool could be increased if the portion of the wall thickness taken up by the groove and securing means could be reduced. In addition, it would be beneficial to reduce the number of parts required to secure the lines to the well tool, and thereby reduce the cost.

It will, therefore, be appreciated that improvements are needed in the art of securing lines to downhole well tools.

SUMMARY

In carrying out the principles of the present disclosure, methods and apparatuses are provided which solve at least one problem in the art. One example is described below in which a dovetail-shaped groove is used to retain the lines. Another example is described below in which a retainer device biases the lines outward into contact with inclined walls of the groove.

In one aspect, a method of securing one or more lines to a well tool is provided. The method includes the steps of: installing the one or more lines in a groove formed longitudinally along an outer surface of the well tool, the groove having a width at the outer surface of the well tool which is narrower than a width of the groove at a position radially inward relative to the outer surface; and securing the one or more lines in the groove.

The securing step may include forcing the one or more lines laterally outward in the groove, positioning a retainer device between two of the lines, installing a fastener between two of the lines, biasing the one or more lines outward against at least one inclined wall of the groove, and/or biasing a portion of a retainer device laterally outward by threading a fastener into the retainer device. The biasing step may include threading the fastener between two of the retainer device portions, with the retainer device portions being positioned between two of the lines.

In another aspect, a well tool is provided. The well tool includes a groove formed longitudinally along an outer surface of an outer housing of the well tool. The groove has a width at the outer surface of the well tool which is narrower than a width of the groove at a position radially inward relative to the outer surface. One or more lines are secured in the groove.

These and other features, advantages, benefits and objects will become apparent to one of ordinary skill in the art upon careful consideration of the detailed description of representative embodiments of the disclosure hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
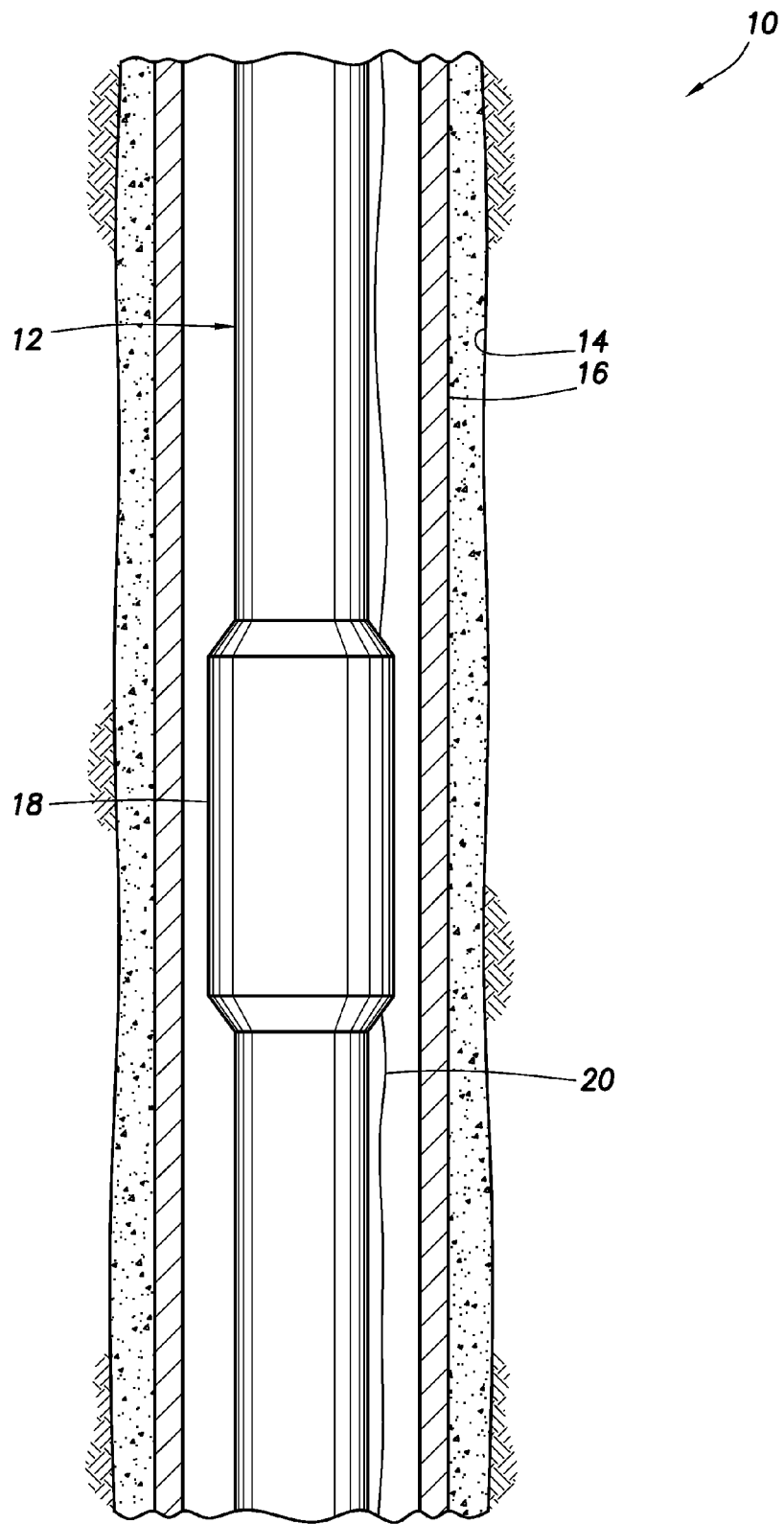
FIG. 1 is a schematic partially cross-sectional view of a well system and associated method embodying principles of the present disclosure.

Representatively illustrated in FIG. 1 is a well system 10 and associated method which embody principles of the present disclosure. In the well system 10, a tubular string 12 has been installed in a wellbore 14. The wellbore 14 may be lined with casing 16, or it may be uncased in the location depicted in FIG. 1.

A well tool 18 is interconnected in the tubular string 12. The well tool 18 could be, for example, a flow control device (such as a valve or a choke), a side pocket mandrel, a latch sub, or any other type of well tool.

The well tool 18 could have an outer dimension (such as an outer diameter) which is larger than an outer diameter of the tubular string 12. For this reason or others, it may be desirable to recess lines 20 into an outer surface of the well tool 18, in order to secure the lines to the tubular string and prevent damage to the lines, especially during installation of the tubular string 12 into the wellbore 14. The lines 20 may be any number and/or combination of hydraulic, electrical, fiber optic, communication, sensor, power, control and/or other types of lines.

The well tool 18 includes unique features which permit the lines 20 to be secured to the well tool, but which require only a minimal portion of a wall thickness of the well tool to be used for this purpose. Thus, the well tool 18 can have increased pressure-bearing capability, increased strength, increased radial clearance in the wellbore 14 or casing 16, and/or increased functionality.

Figure 2A:
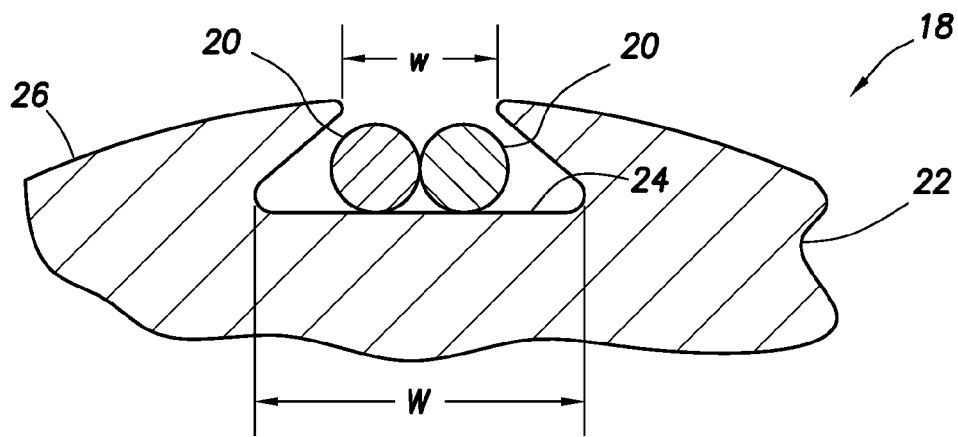
FIGS. 2A-C are enlarged schematic cross-sectional views of successive steps in a method of securing lines in a groove in an outer housing of a well tool in the system of FIG. 1.
Figure 2B:
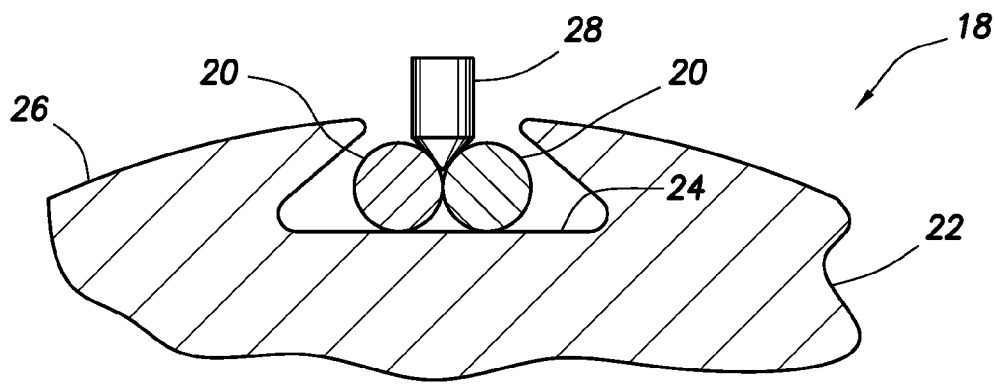
Figure 2C:
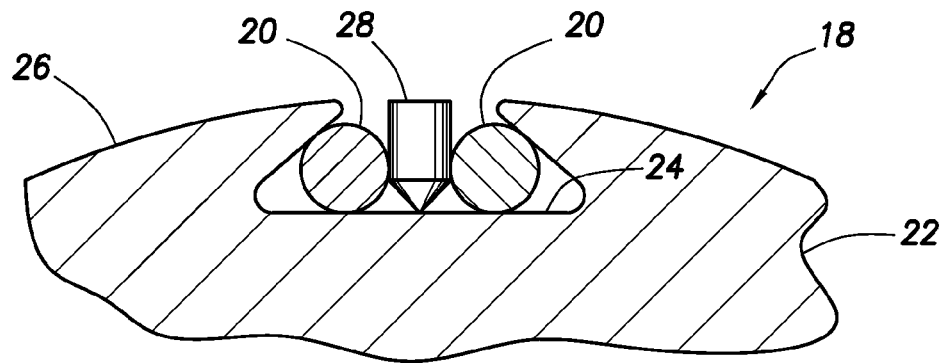

Referring additionally now to FIGS. 2A-C, successive steps in a method of securing the lines 20 to the well tool 18 are representatively illustrated. In these figures, a schematic cross-sectional view of a portion of an outer housing 22 of the well tool 18 is depicted.

Two of the lines 20 are depicted as being secured in a longitudinally extending groove 24 formed in an outer surface 26 of the outer housing 22. However, it should be understood that any number (including one) of the lines 20 could be secured in the groove 24 in keeping with the principles of this disclosure.

The groove 24 has a width w at the outer surface 26 which is narrower than a width W of the groove radially inward from the outer surface. As depicted in FIGS. 2A-C, the groove 24 is dovetail-shaped, but other shapes (such as diamond-shaped, circular, oval, etc.) may be used in keeping with the principles of this disclosure.

In FIG. 2A, the lines 20 have been inserted into the groove 24. The lines 20 may be inserted laterally or longitudinally into the groove 24, either prior to or during installation of the well tool 18 into the wellbore 14.

In FIG. 2B, a retainer device 28 is being installed laterally between the lines 20. The retainer device 28 in this example has a wedge-shaped side which is used to bias the lines 20 laterally outward in opposite directions. The retainer device 28 is preferably made of an appropriate material and configured to prevent damage to the lines 20 during installation and in subsequent downhole operations.

In FIG. 2C, the retainer device 28 has been fully installed between the lines 20, so that the lines 20 are displaced laterally outward in the groove 24. Due to the relatively narrow width w of the groove 24 at the outer surface 26 of the well tool 18, removal of the lines 20 from the groove is prevented while the retainer device 28 is between the lines.

Note that the configuration of FIGS. 2A-C (as well as the other configurations described below) can still be used if only one line 20 is to be secured in the groove 24. For example, a dummy or substitute line could be used in place of one of the lines 20, in order to take up space in the groove 24. Alternatively, half of the groove 24 could be formed in the outer surface 26 of the well tool 18 to accommodate only a single line 20.

Figure 3:
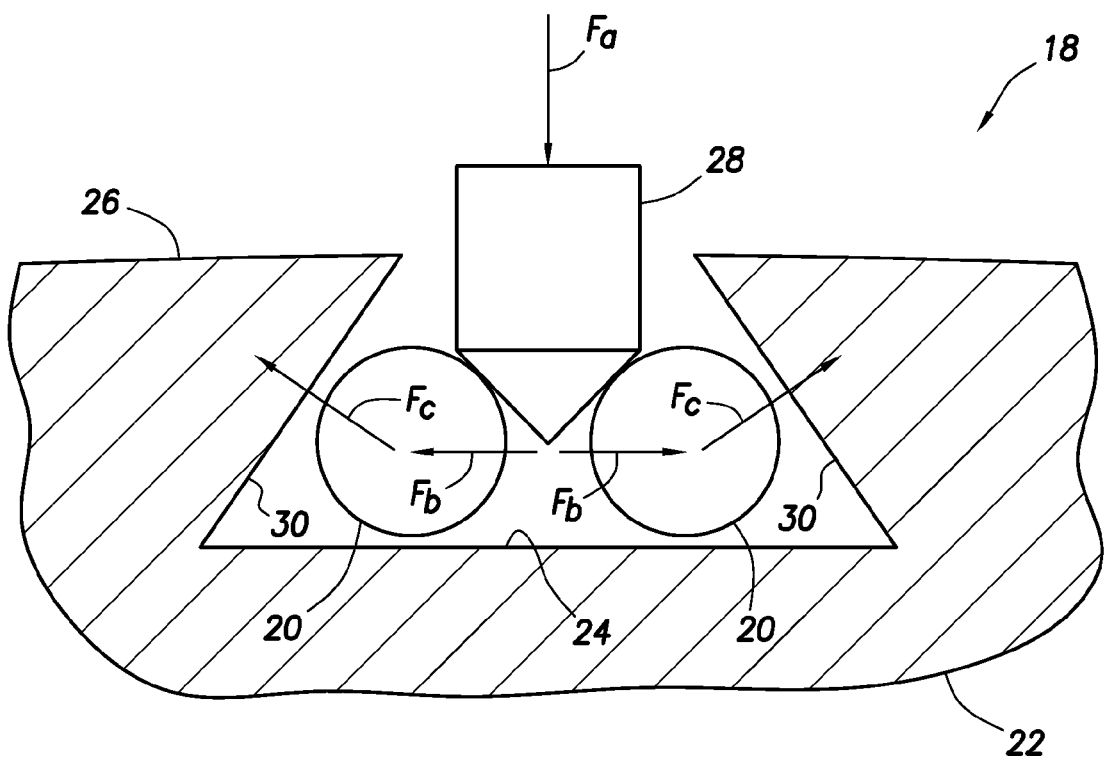
FIG. 3 is a further enlarged scale schematic cross-sectional view of biasing forces resulting from the method of FIGS. 2A-C.

Referring additionally now to FIG. 3, an enlarged scale schematic view of the well tool 18 during installation of the retainer device 28 is representatively illustrated. In this view, the biasing forces which result from installation of the retainer device 28 can be seen.

A biasing force Fa applied to the retainer device 28 causes the lines 20 to be displaced laterally outward by resulting oppositely directed lateral biasing forces Fb. When the lines 20 contact inclined walls 30 of the groove 24, contact forces Fc will operate to retain the lines within the groove.

Figure 4:
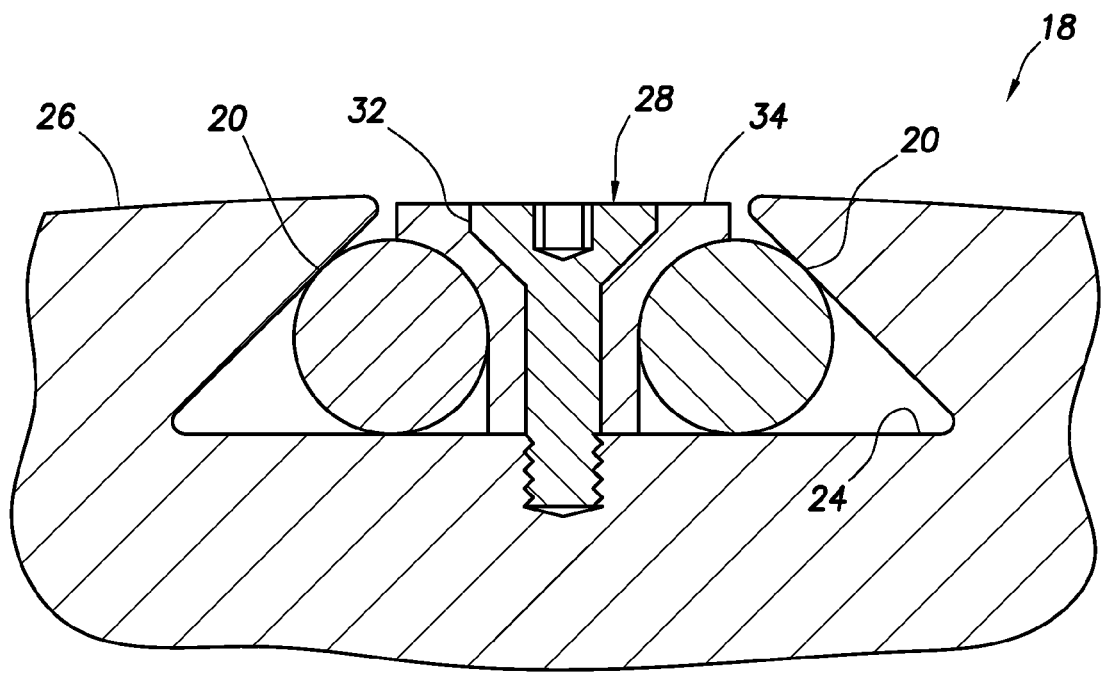
FIG. 4 is a schematic cross-sectional view of another configuration of the well tool.

Referring additionally now to FIG. 4, another configuration of the retainer device 28 is representatively illustrated in the well tool 18. In this configuration, the retainer device 28 includes a fastener 32 (such as a screw or bolt, etc.) for preventing inadvertent removal of the retainer device.

This configuration of the retainer device 28 also includes a longitudinally extending body 34 which is shaped in such a manner as to laterally outwardly separate the lines 20, as well as to overlie the lines near the outer portion of the groove 24 and thereby protect the lines and provide additional assurance that removal of the lines from the groove will be prevented. The body 34 may be made of aluminum, plastic, composite or any other material to ensure damage to the lines 20 is prevented.

Figure 5:
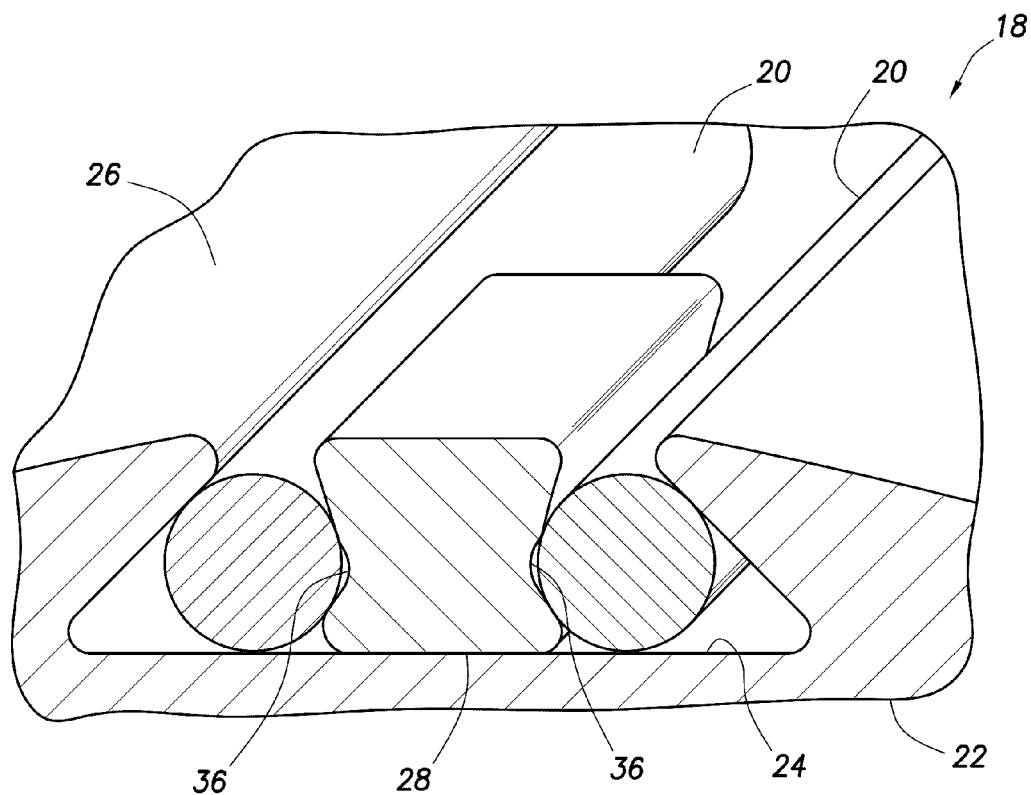
FIG. 5 is a schematic cross-sectional view of yet another configuration of the well tool.

Referring additionally now to FIG. 5, another configuration of the retainer device 28 is representatively illustrated. In this configuration, the retainer device 28 has opposing concave sides 36 shaped for complementarily receiving the lines 20 therein. The retainer device 28 may be installed by sliding it longitudinally into the groove 24 from an end thereof, after the lines 20 have been installed in the groove.

Figure 6:
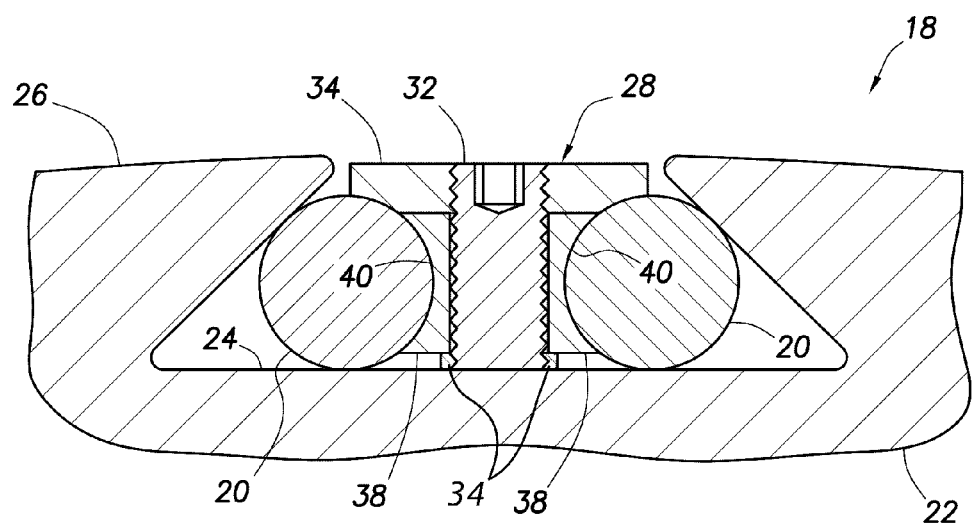
FIG. 6 is a schematic cross-sectional view of a further configuration of the well tool.

Referring additionally now to FIG. 6, another configuration of the retainer device 28 is representatively illustrated. In this configuration, the retainer device 28 includes a body 34, a fastener 32, and two retainer device portions 38 fitted in a recess in the body similar in some respects to the configuration of FIG. 4. However, in the configuration of FIG. 6, the fastener 32 of the retainer device 28 is a set screw-type of fastener which is threaded into the body 34 after installation, in order to laterally outwardly displace the two retainer device portions 38.

The retainer device portions 38 have concave sides 40 for receiving the lines 20 therein. The portions 38 may be made of a relatively soft material (such as plastic, aluminum, composite, etc.) to prevent damage to the lines 20. Preferably, the portions 38 laterally outwardly bias the lines 20 into contact with the walls 30 of the groove 24.

It may now be fully appreciated that the above disclosure provides many advancements to the art of securing lines to downhole well tools. In the examples described above, the well tool 18 includes unique features which permit the lines 20 to be secured to the well tool, but which require only a minimal portion of a wall thickness of the well tool to be used for this purpose. Thus, the well tool 18 can have increased pressure-bearing capability, increased strength, increased radial clearance in the wellbore 14 or casing 16, and/or increased functionality. In addition, the number of parts required to secure the lines 20 is reduced, thereby reducing the cost.

The above disclosure provides a method of securing one or more lines 20 to a well tool 18. The method includes the steps of: installing the one or more lines 20 in a groove 24 formed longitudinally along an outer surface 26 of the well tool 18, the groove 24 having a width w at the outer surface 26 of the well tool 18 which is narrower than a width W of the groove 24 at a position radially inward relative to the outer surface 26; and securing the one or more lines 20 in the groove 24.

The securing step may include forcing the one or more lines 20 laterally outward in the groove 24, positioning a retainer device 28 between two of the lines 20, installing a fastener 32 between two of the lines 20, biasing the one or more lines 20 outward against at least one inclined wall 30 of the groove 24 extending between the first and second widths w, W, and/or biasing a portion 38 of a retainer device 28 laterally outward by threading a fastener 32 into the retainer device. The biasing step may include threading the fastener 32 between two of the retainer device portions 38, with the retainer device portions being positioned between two of the lines 20.

The above disclosure also provides a well tool 18 which includes a groove 24 formed longitudinally along an outer surface 26 of an outer housing 22 of the well tool 18. The groove 24 has a width w at the outer surface 26 of the well tool 18 which is narrower than a width W of the groove 24 at a position radially inward relative to the outer surface 26. One or more lines 20 are secured in the groove 24.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of securing one or more lines to a well tool, the method comprising the steps of:
    positioning the one or more lines in a groove formed longitudinally along an outer surface of the well tool, the groove having a first width at the outer surface of the well tool which is narrower than a second width of the groove at a position radially inward relative to the outer surface;
    then laterally installing a retainer device in the groove through the first width; and
    biasing a portion of the retainer device toward a side of the groove by threading a fastener of the retainer device into a body of the retainer device, thereby securing the one or more lines in the groove.

2. The method of claim 1, wherein the installing step further comprises forcing at least one of the lines toward the side of the groove.

3. The method of claim 1, wherein at least one of the lines comprises a dummy line.

4. The method of claim 1, wherein the retainer device does not radially project beyond the outer surface of the well tool after completion of the installing step.

5. The method of claim 1, wherein the installing step further comprises biasing at least one of the lines toward a wall extending between the first and second widths of the groove.

6. The method of claim 1, wherein the retainer device biases at least one of the lines towards the side of the groove.

7. The method of claim 1, wherein the biasing step further comprises threading the fastener between a first and a second portion of the retainer device.

8. A well tool, comprising:
    a groove formed longitudinally along an outer surface of an outer housing of the well tool, the groove having a first width at the outer surface of the well tool which is narrower than a second width of the groove at a position radially inward relative to the outer surface;
    a retainer device which is configured to be laterally installed in the groove through the first width and which secures one or more lines in the groove,
    wherein a portion of the retainer device is biased toward a side of the groove by a threaded fastener of the retainer device, thereby securing the one or more lines in the groove.

9. The well tool of claim 8, wherein at least one of the lines comprises a dummy line.

10. The well tool of claim 8, wherein the retainer device does not radially project beyond the outer surface of the well tool when the one or more lines are secured in the groove by the retainer device.

11. The well tool of claim 8, wherein the retainer device biases at least one of the lines toward a wall extending between the first and second widths of the groove, thereby securing the one or more lines in the groove.

12. The well tool of claim 8, wherein the retainer device biases at least one of the lines toward the side of the groove.

13. The well tool of claim 8, wherein the fastener is threaded between a first and a second portion of the retainer device.

14. A method of securing one or more lines to a well tool, the method comprising the steps of:
    installing the one or more lines in a groove formed longitudinally along an outer surface of the well tool, the groove having a first width at the outer surface of the well tool which is narrower than a second width of the groove at a position radially inward relative to the outer surface; and
    securing the one or more lines in the groove, wherein the securing step further comprises laterally installing a retainer device in the groove through the first width and biasing a portion of the retainer device toward a side of the groove by threading a fastener into the retainer device.

15. The method of claim 14, wherein the biasing step further comprises threading the fastener between a first and a second portion of the retainer device.

16. A well tool, comprising:
    a groove formed longitudinally along an outer surface of an outer housing of the well tool, the groove having a first width at the outer surface of the well tool which is narrower than a second width of the groove at a position radially inward relative to the outer surface; and
    one or more lines secured in the groove by a retainer device which is configured to be laterally installed in the groove through the first width, wherein a portion of the retainer device is biased toward a side of the groove by a fastener of the retainer device threaded into the retainer device, thereby preventing removal of the lines from the groove.

17. The well tool of claim 16, wherein the fastener is threaded between a first and a second portion of the retainer device.

* * * * *